(12) United States Patent
Babin et al.

(10) Patent No.: US 6,658,960 B2
(45) Date of Patent: Dec. 9, 2003

(54) TRANSMISSION SHIFT POSITION SENSOR

(75) Inventors: Brian George Babin, Goshen, IN (US); Norman Thomas Freda, Canton, MI (US); Todd Anthony Brown, Roanoke, IN (US)

(73) Assignee: American Electronic Components, Inc., Elkhart, IN (US)

( * ) Notice: Subject to any disclaimer, the term of this patent is extended or adjusted under 35 U.S.C. 154(b) by 0 days.

(21) Appl. No.: 09/957,840

(22) Filed: Sep. 21, 2001

(65) Prior Publication Data

US 2003/0056614 A1 Mar. 27, 2003

(51) Int. Cl.[7] .............................................. F16H 59/02
(52) U.S. Cl. ...................................... 74/473.28; 74/335
(58) Field of Search .............................. 74/473.28, 335, 74/473.27, 473.12

(56) References Cited

U.S. PATENT DOCUMENTS

| | | |
|---|---|---|
| 4,683,768 A | 8/1987 | Budinski |
| 4,907,475 A | 3/1990 | Holbrook |
| 4,936,166 A | 6/1990 | Holbrook et al. |
| 5,468,197 A | 11/1995 | Loeffler |
| 5,651,293 A | 7/1997 | Ebenstein |
| 5,673,596 A | 10/1997 | Lu |
| 5,757,181 A | 5/1998 | Wolf et al. |
| 5,775,166 A | 7/1998 | Osborn et al. |
| 5,846,160 A | 12/1998 | Tuday |
| 5,847,344 A | 12/1998 | Denyer et al. |
| 5,867,092 A | 2/1999 | Vogt |
| 5,934,436 A | 8/1999 | Raszkowski et al. |
| 6,018,294 A | 1/2000 | Vogel et al. |
| 6,027,426 A | 2/2000 | Holman |
| 6,072,390 A | 6/2000 | Dourra et al. |
| 6,124,789 A | 9/2000 | Barr |
| 6,198,275 B1 | 3/2001 | Wolf et al. |
| 6,209,408 B1 | 4/2001 | DeJonge et al. |
| 6,289,756 B1 * | 9/2001 | Roemen et al. ............... 74/335 |

\* cited by examiner

Primary Examiner—David A. Bucci
Assistant Examiner—Julie K. Smith
(74) Attorney, Agent, or Firm—Katten Muchin Zavis Rosenman; John S. Paniaguas

(57) ABSTRACT

A transmission shift position sensor that is adapted to provide an indication of the position of a transmission shift lever. The transmission shift position sensor includes a rotary position sensor and a rooster comb formed as an assembly. The direct coupling of the sensor to the rooster comb provides a positive indication of the automatic transmission shift sensor without the need for compensating for tolerances in mechanical linkages.

4 Claims, 10 Drawing Sheets

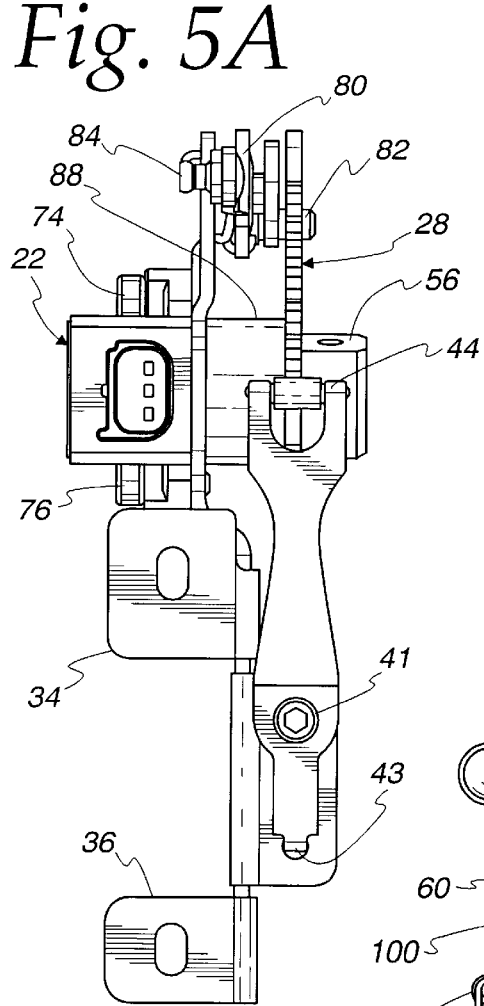
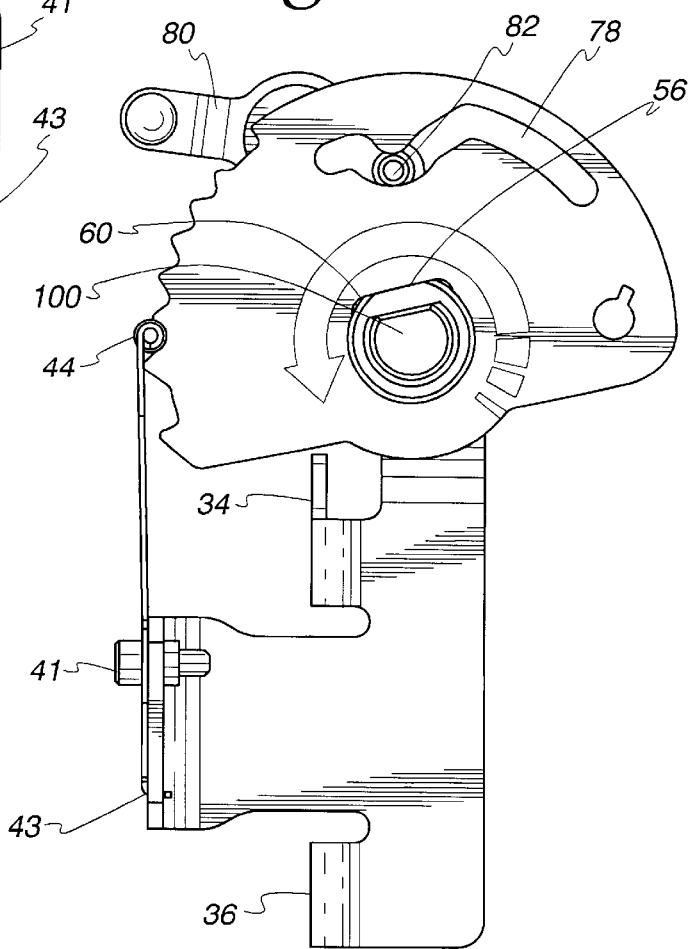

TRANSMISSION SHIFT POSITION SENSOR

BACKGROUND OF THE INVENTION

1. Field of the Invention

The present invention relates to a transmission shift position sensor and more particularly to a transmission shift position sensor configured to be disposed within an automatic transmission housing and directly coupled to a so-called rooster comb. The transmission shift position sensor includes a rotary position sensor, optionally configured to be electronically calibrated to the detent positions of the rooster comb, to compensate for mechanical tolerances in the assembly and generate an electrical signal, for example, a linear signal pulse width modulated signal, representative of the position of the transmission shift position.

2. Description of the Prior Art

Various transmission shift position sensors for sensing the position of a transmission shifter assembly or an automatic transmission are known in the art. Examples of such shift position sensors are disclosed in U.S. Pat. Nos. 4,683,768; 4,907,475; 4,936,166; 5,247,279; 5,468,197; 5,651,293; 5,673,596; 5,775,166; 5,846,160; 5,847,344; 5,867,092; 5,934,436; 6,018,294; 6,027,026; 6,072,390; 6,124,789 and 6,209,408. These patents disclose various techniques for sensing the position of the transmission shift used to shift gears of an automatic transmission. For example, U.S. Pat. Nos. 5,847,344; 6,027,426 and 6,209,408 disclose transmission shift position sensors which sense the position of the transmission shift lever within the passenger compartment of the vehicle. However, the signals from such transmission shift position sensors are known to be not inherently accurate due to the tolerances in the mechanical linkages between the transmission shift lever and the automatic transmission. In particular, such automatic transmissions are hydraulic mechanisms which rely primarily on the position of manual control valves within the automatic transmission housings to direct fluid flow to change the shift positions, for example, as disclosed in U.S. Pat. Nos. 4,683,768; 4,936,166; 5,651,293 and 5,846,160, all hereby incorporated by reference. In general mechanical linkages are used to position hydraulic control valves which, in turn, control the automatic transmission. In general, these mechanisms include a so-called "rooster comb" that is mechanically coupled on one end to a transmission shift lever within the vehicle passenger compartment and is mechanically coupled to the hydraulic control valves within the automatic transmission housing. Such rooster combs are normally disposed within the automatic transmission housing and are formed with a cam surface having a number of detent positions which cooperate with a biasing member for latching each of the shift positions of the automatic transmission. Often times, tolerances or play in the mechanical linkages can result in relatively inaccurate signals being generated by transmission shift position sensors which rely on the position of the transmission shift lever within the vehicle passenger compartment such as disclosed in U.S. Pat. Nos. 5,847,344; 6,027,426 and 6,209,408. Such inaccurate transmission shift position sensor signals are highly undesirable for several reasons. First, such signals are known to be applied to a powertrain control module which prevents cranking of the engine unless the transmission is in the park or neutral positions. In addition, such position signals are also used to provide the vehicle operator with a visual indication of the shift position of the automatic transmission. Lastly, such signals are used to control operation of the reverse back-up lamps in an automobile. Accordingly, it is necessary to have a relatively accurate indication of the transmission shift position.

In an effort to improve the accuracy of such transmission shift position sensors, new sensors have been developed. For example, U.S. Pat. No. 4,907,475 discloses a shift position sensor which relies on pressure switches within the automatic transmission housing. With this sensor, the pressure at various points within the automatic transmission is sensed to provide a signal representative of the shift position of the automatic transmission. Such sensors are also subject to various inaccuracies which can result in an incorrect indication of the shift position of the automatic transmission. For example, such sensors are subject to changes in pressure within the automatic transmission; as well as tolerances in drifting of the set point of the pressure switches.

Still other systems have been developed which incorporate sensors within the transmission housing in an attempt to provide more accurate sensing of the position of the transmission shift lever. For example, U.S. Pat. No. 6,018,294 discloses a shift position sensor which includes a rooster comb which includes a cam surface which corresponds to the detent positions of the rooster comb. An electronic contact-type switch rides along the cam surface to provide an indication of the rooster comb and thus the shift position of the automatic transmission. Such a sensor as disclosed in the '294 patent, incorporates a contact-type switch, which, unfortunately, is subject to wear and failure. Moreover, replacement of the worn switch would be rather difficult and expensive for a consumer since the switch is disposed within the transmission housing.

In order to avoid the problems associated with contact-type switches, sensors have been developed which incorporate non contact-type sensors. For example, U.S. Pat. No. 5,867,092 discloses a position sensor for a transfer case for a four wheel drive vehicle. The transfer case includes an input shaft which drives a planetary gear assembly which provides various speed reduction ratios to provide two-wheel or four-wheel operation. Various gear reduction ratios are selected by a shift control rod.

This includes a plurality of Hall effect sensors disposed within the transfer case housing. The Hall effect sensors are disposed to detect the position of a metal plate coupled to a transmission shift control rod. While the shift position sensor utilizes non-contact Hall effect sensors for sensing the position of a shift control rod in a transfer case, the sensor disclosed in the '092 patent is based upon utilizing three Hall effect sensors and a metal plate attached to the shift control rod within the transfer case housing. Unfortunately, there is insufficient room in automatic transmission housing for such a configuration. Thus, there is a need for a non-contact sensor for sensing the position of a transmission shift lever which provides an accurate indication of the position of the transmission shift lever.

SUMMARY OF THE INVENTION

Briefly, the present invention relates to a transmission shift position sensor that is adapted to provide an indication of the position of a transmission shift lever. The transmission shift position sensor includes a rotary position sensor and a rooster comb formed as an assembly. The direct coupling of the sensor to the rooster comb provides a positive indication of the automatic transmission shift sensor without the need for compensating for tolerances in mechanical linkages.

DESCRIPTION OF THE DRAWINGS

These and other advantages of the present invention will be readily understood with reference to the following specification and attached drawing wherein:

FIGS. 5A and 5B are similar to FIGS. 4A and 4B but in a reverse position.

DETAILED DESCRIPTION

Figure 1:
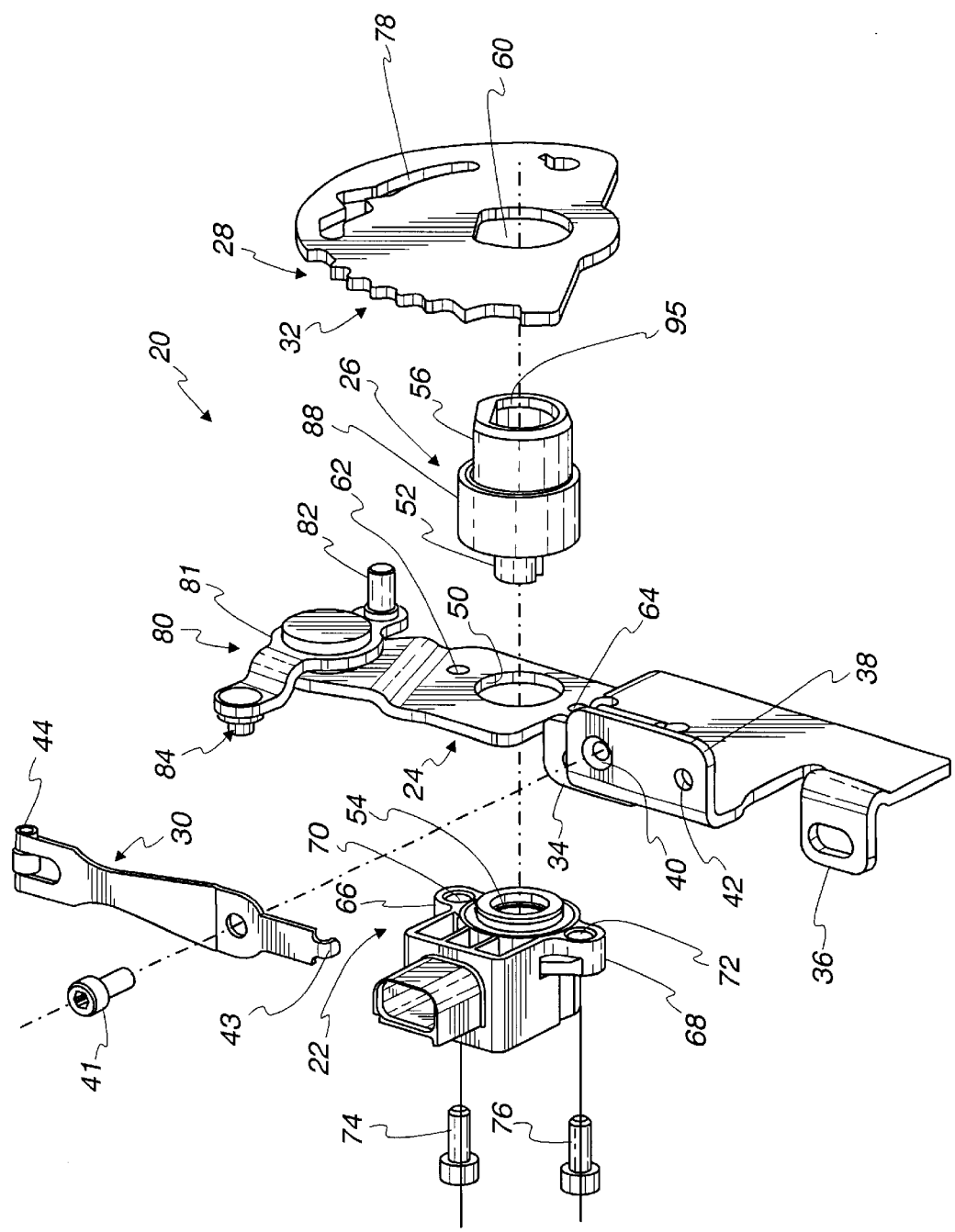
FIG. 1 is a exploded perspective view of a transmission shift position sensor assembly in accordance with the present invention.

The present invention relates to a transmission shift position sensor which provides a positive indication of the transmission shift position. The transmission shift position sensor in accordance with the present invention, generally identified with the reference numeral 20, is directly coupled to a rooster comb and is disposed within the automatic transmission housing. By providing direct coupling of the transmission position sensor to the rooster comb, a positive indication of the shift position of the automatic transmission is provided.

The shift position sensor includes a rotary position sensor which, in turn, includes a Hall effect IC to provide non-contact-type sensing of the position of the rooster comb. A drive arm is directly coupled to the rooster comb and to the rotary position sensor. The rotary position sensor is calibrated to the various detent positions corresponding the automatic transmission shift positions on the rooster comb. The rotary position sensor may optionally be provided with a electronic calibration circuit which enables the rotary position sensor to be electronically calibrated.

Referring to FIG. 1, the transmission shift position sensor 20 in accordance with the present invention is illustrated. The transmission shift position sensor 20 includes a rotary position sensor 22, a bracket assembly 24, a drive arm or adapter 26, a rooster comb 28 and a detent spring assembly 30. The rooster comb 28 is formed with a number of detent positions, generally identified with the reference numeral 32, for latching the automatic transmission in a selected shift position. The detent positions 32 are adapted to receive the detent spring assembly 30 to latch the rooster comb 32 and thus the automatic transmission in the selected automatic transmission shift position.

Figure 2A:
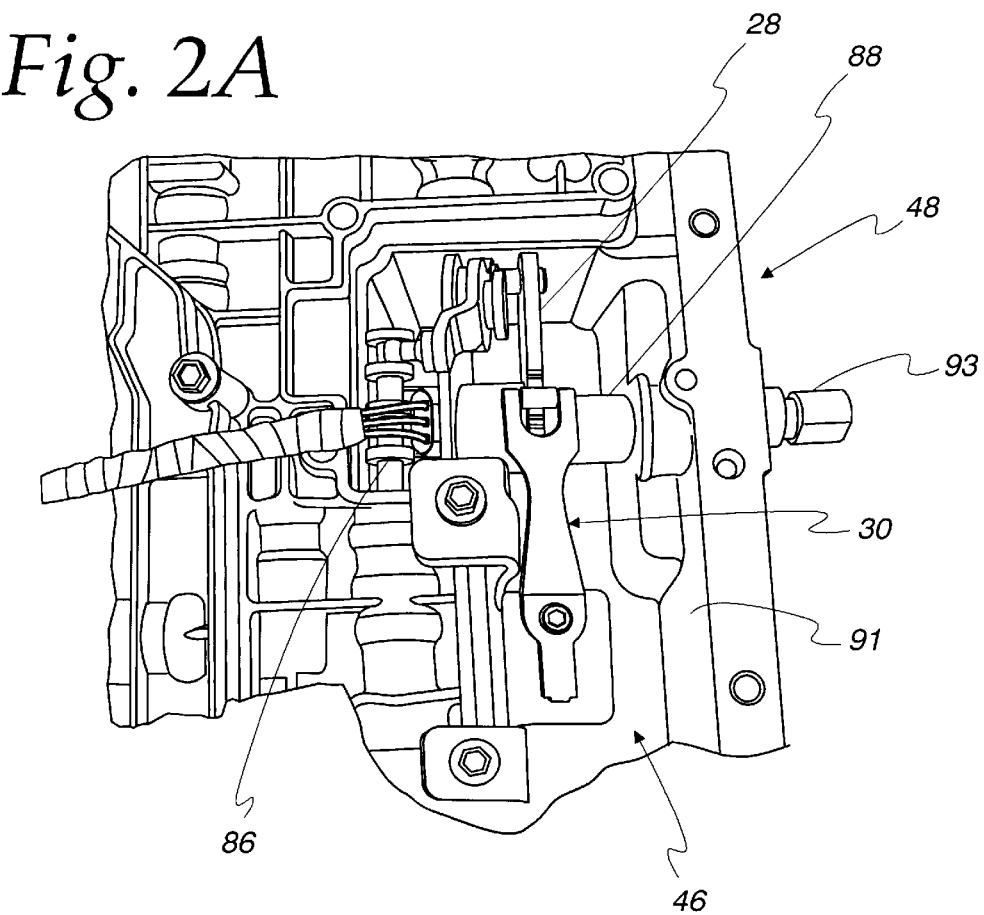
FIG. 2A is a partial plan view of a transmission housing shown with a hydraulic control valve.
Figure 2B:
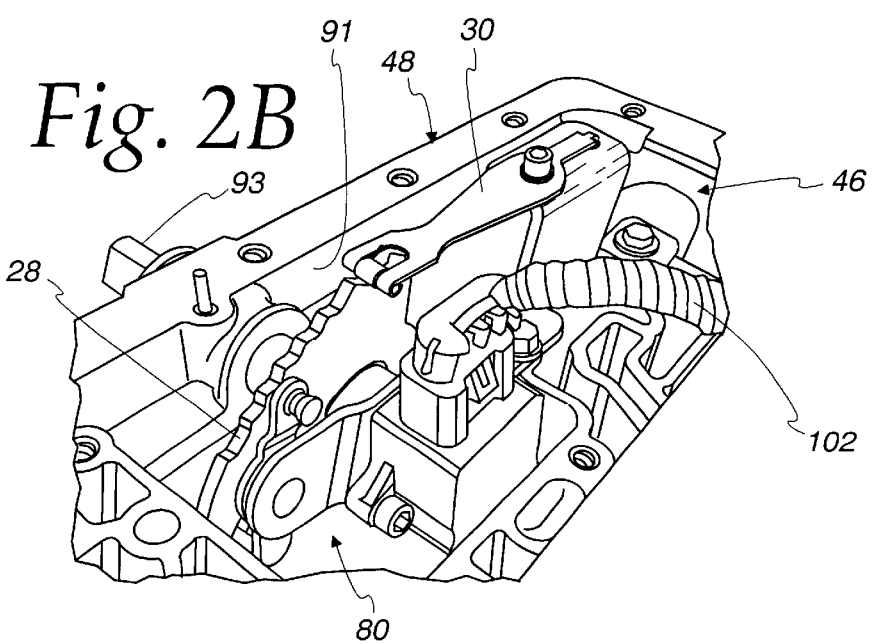
FIG. 2B is a partial perspective view illustrating the transmission shift sensor in accordance with the present invention installed within a cavity of a transmission housing.

The bracket assembly 24 is adapted to be secured within an automatic transmission housing by way of a pair of slotted flanges 34 and 36. The bracket assembly 34 is provided with a third flange 38 which includes a pair of spaced apart apertures 40 and 42 for receiving and securing the detent spring assembly 30, for example, by way of a fastener 41 and a tab 43. The position of the flange assembly 24 is selected such that a roller 44 disposed on one end of the detent spring assembly 30 is in communication with the detent positions 32 on the rooster comb 28. The configuration of the bracket assembly 24 as well as the entire assembly is selected to fit within a cavity, generally identified with the reference numeral 46 (FIGS. 2A and 2B) in an automatic transmission housing 48.

The bracket assembly 24 includes an aperture 50 for receiving an extending end 52 of the adapter 26 that is adapted to be coupled to the rotary position sensor 22 by way of central aperture 54. The other end 56 of the adapter 26 is formed with in irregular shape or keyed to be received within a corresponding aperture 60 in the rooster comb 28, such that rotation of the drive arm 26 will cause rotation of the rooster comb 28.

As shown, the bracket 24 assembly includes two spaced apart apertures 62 and 64, adjacent opposing ends of the aperture 50, which are aligned with a pair of opposing flanges 66 and 68 on the rotary position sensor 20. The flanges 66 and 68 on the rotary position sensor 20 are provided with through holes 70 and 72 to enable the rotary position sensor 22 to be rigidly secured to the bracket assembly 24 with suitable fasteners 74 and 76.

The rooster comb 28 is provided with a cam slot with cooperates with a rotatable linkage 80 rotatably, attached to one end of the bracket assembly 24. The rotatable linkage 80 is formed from a lever 81 which includes a pair of oppositely facing studs 82 and 84 on opposing ends. The stud 82 functions as a cam and is adapted to be received in a cam slot 78, formed in the rooster comb 28. The other stud 84 is adapted to be mechanically coupled to a manual valve 86 (FIG. 2A), which controls the shift position of the automatic transmission 48.

Figure 4A:
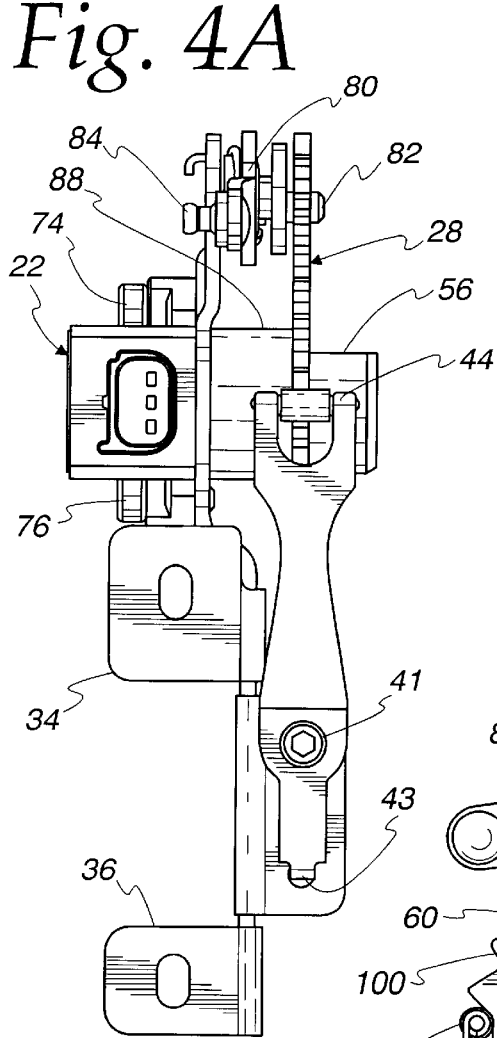
FIG. 4A is a plan view of a transmission shift sensor assembly in a parked position.
Figure 4B:
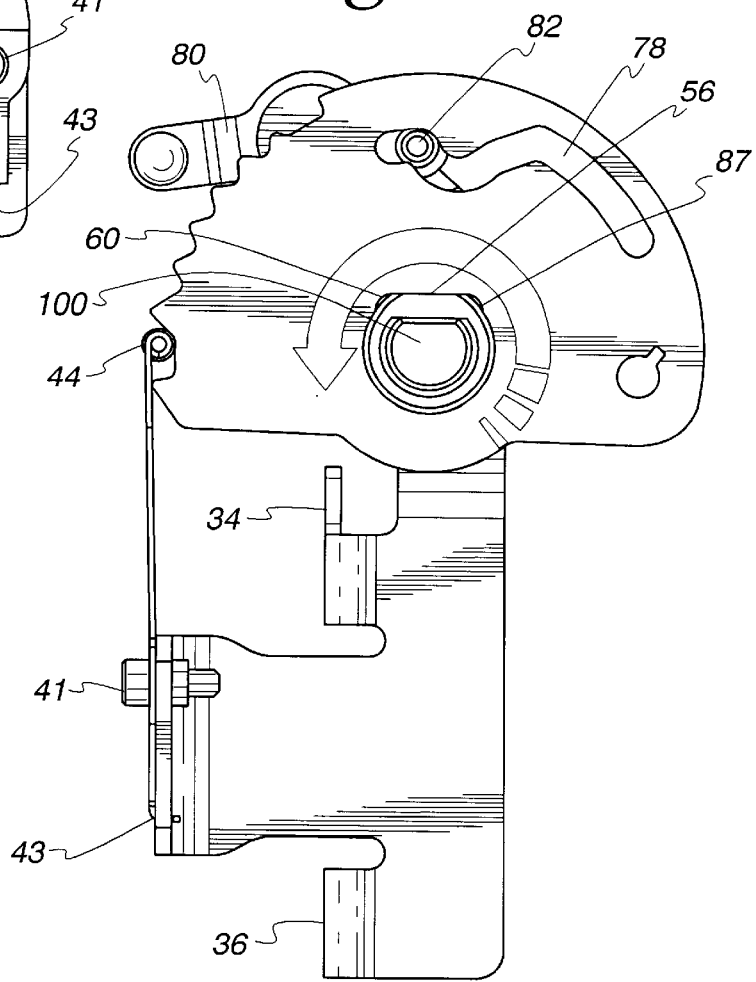
FIG. 4B is a elevational view of a transmission shift sensor in accordance with the present invention in a parked position.
Figure 6A:
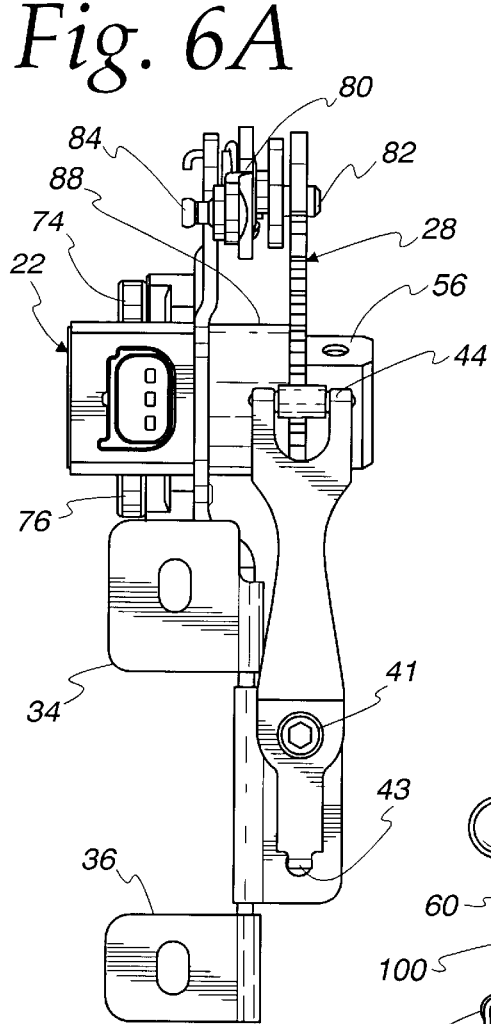
FIGS. 6A and 6B are similar to FIGS. 4A and 4B but in a neutral position.
Figure 6B:
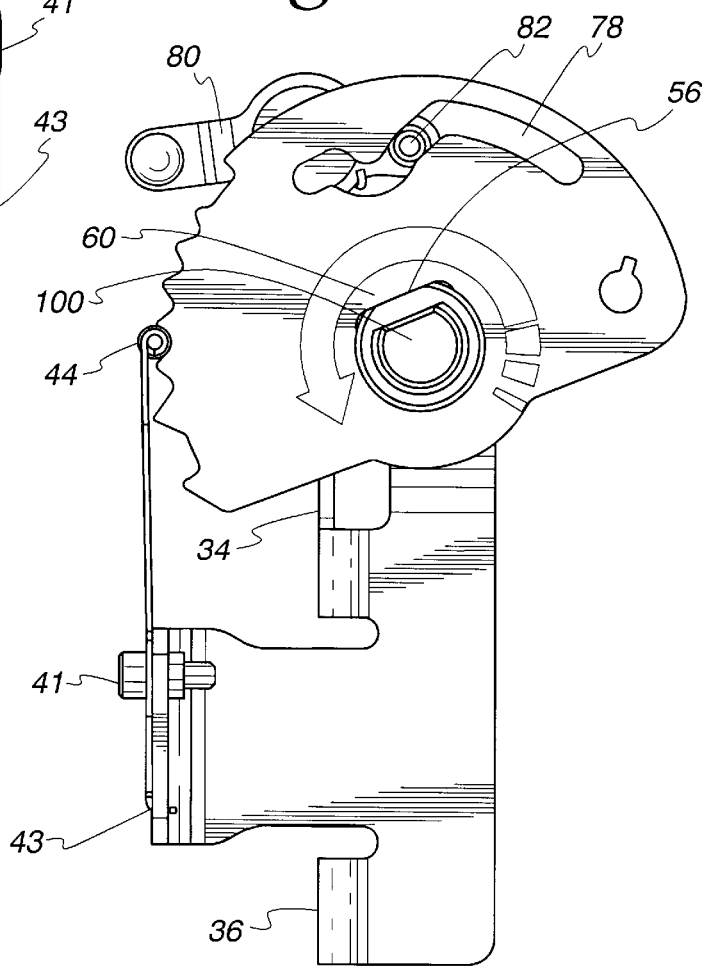
Figure 7A:
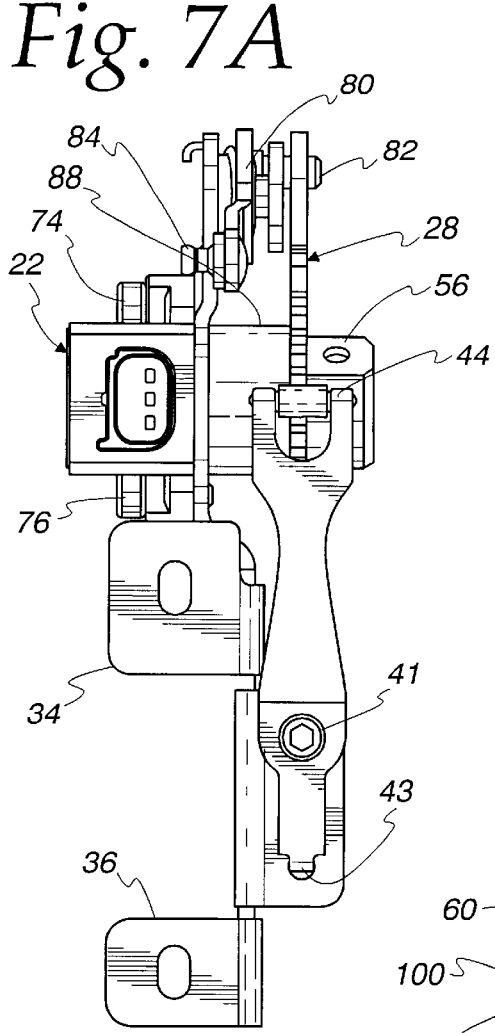
FIGS. 7A and 7B are similar to FIGS. 4A and 4B but in a drive position.
Figure 7B:
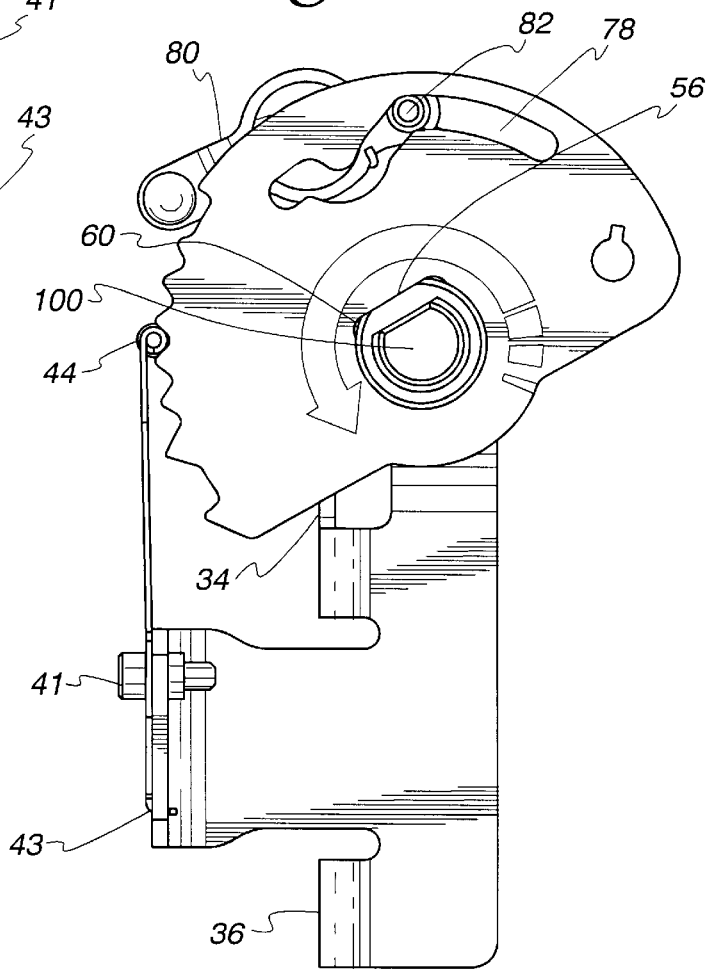
Figure 8A:
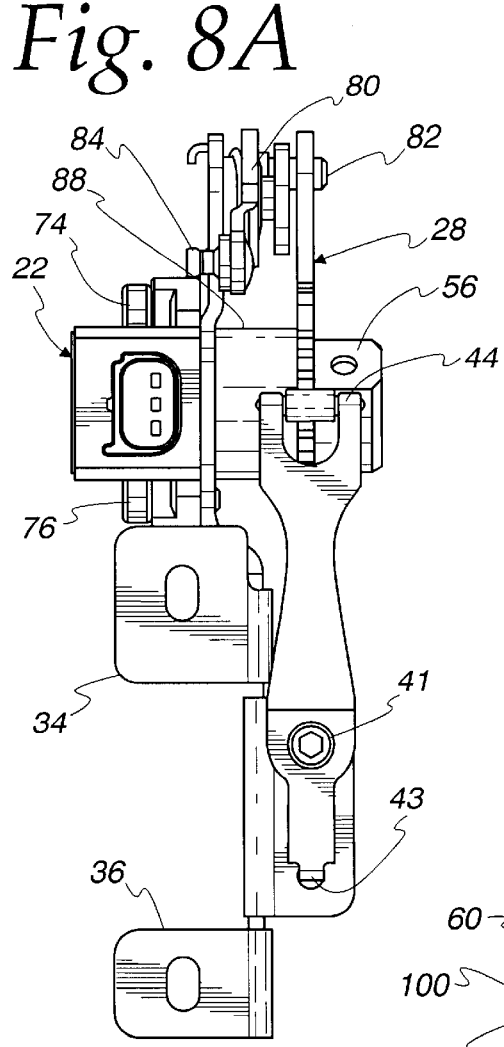
FIGS. 8A and 8B are similar to FIGS. 4A and 4B but in a manual three position.
Figure 8B:
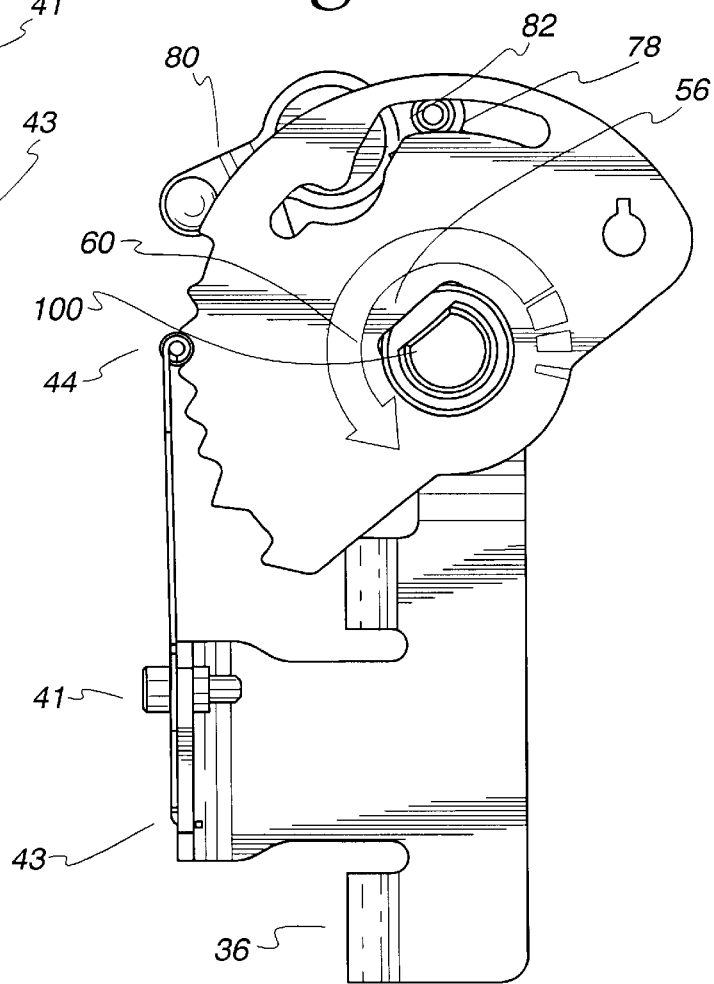
Figure 9A:
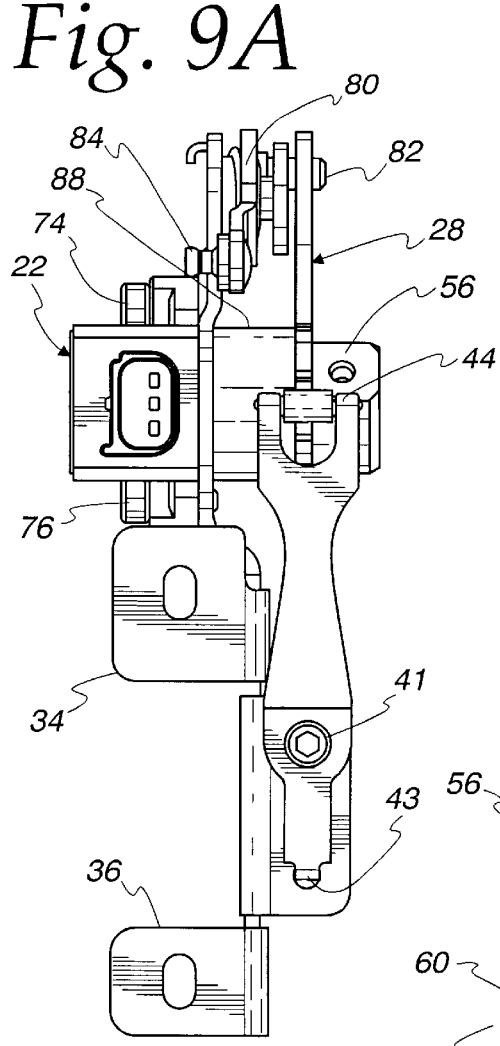
FIGS. 9A and 9B are similar to FIGS. 4A and 4B but in a manual two position.
Figure 9B:
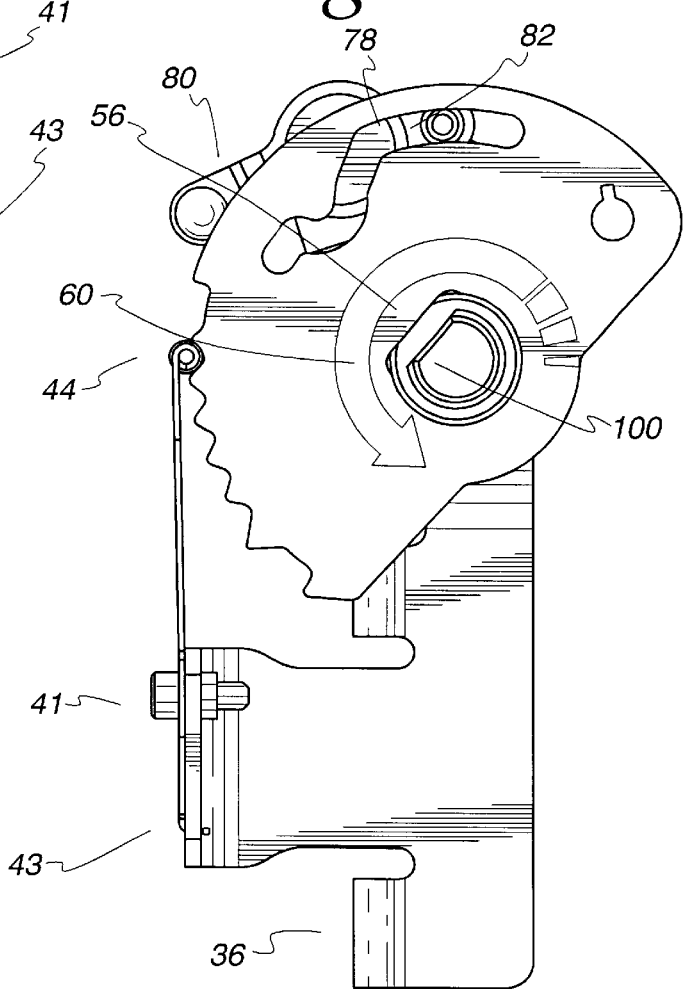
Figures 10A, 10B:
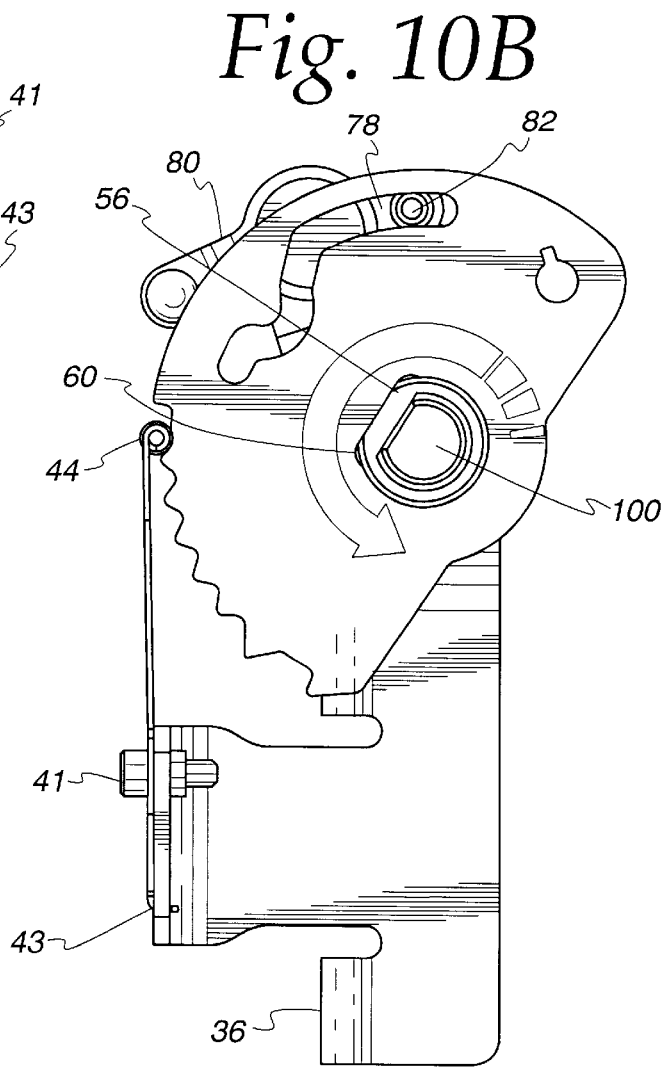
FIGS. 10A and 10B are similar to FIGS. 4A and 4B but in a manual one position.

The adapter 26 is provided with an increased diameter portion 88 which enables the drive arm to be sandwiched between the bracket assembly 24 and the rooster comb 28 and provide bearing surfaces relative thereto. The rooster comb 28, in turn, may be rigidly secured to the adapter 26 by various conventional methods including brazing or by way of a c-clamp 87 (FIG. 4B). After assembly into the automatic transmission 48 (FIG. 2A), the extending portion 56 (FIG. 1) of the adapter 26 is disposed adjacent a sidewall 91 (FIGS. 2A and 2B) of the automatic transmission 48. The extending portion 56 (FIG. 1) is directly coupled to a shaft 93 (FIGS. 2A and 2B) which extends through the sidewall 91. The shaft 93 is rotatable relative to the sidewall 91 and is hermetically sealed thereto in a known manner. One end (not shown) of the shaft 93 is configured to be received within a central aperture 95 (FIG. 1) of the adapter 56 such that rotation of the shaft 93 (FIGS. 2A and 2B) causes rotation of the adapter 26 (FIG. 1).

The rotary position sensor may be a rotary position sensor, for example, as disclosed in U.S. Pat. Nos. 5,757,181 and 6,198,275 assigned to American Electronic Components, Inc. or alternatively as disclosed in copending application Ser. No. 09/653,507, filed on Sep. 1, 2000 and may be formed with various types of circular magnets including both diametric and radially magnetized magnets. A compensation circuit may optionally be provided, for example, as disclosed in aforementioned American Electronic Components, Inc. U.S. Patents. The compensation circuit may be used to electronically calibrate the rotary position sensor 22.

Figure 3A:
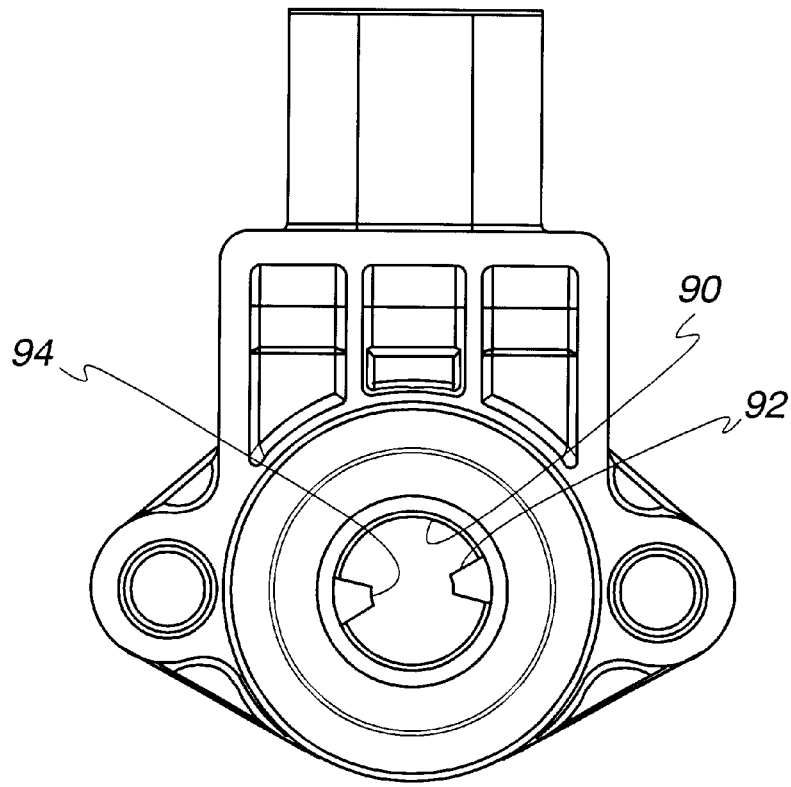
FIG. 3A is a plan view of a rotary position sensor for use with the present invention illustrating the rotary drive for receiving one end of the drive arm.

With reference to FIG. 3A, the rotary position sensor 22 includes a rotor drive cavity 90, formed with two opposing tabs 92 and 94. These tabs 92 and 94 are adapted to be received in axial slots 96 and 98, formed on the end 52 the adapter 26 such that rotation of the adapter 26 causes a corresponding rotation of rotary drive cavity 90. Other configurations are possible and are well within the ordinary skill in the art.

Figure 3B:
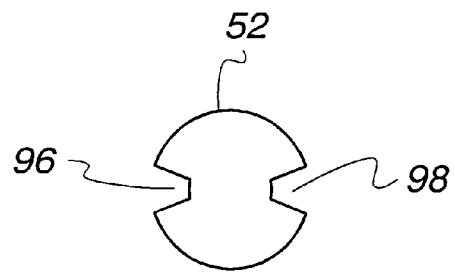
FIG. 3B is a plan view of one end of the drive arm in accordance with the present invention.

FIGS. 4A through 10B illustrate the various positions of the assembly in a park, reverse, neutral, drive, manual 3, manual 2 and manual 1 (FIG. 3B) position of the transmission shift sensor 20 in accordance with the present invention. As shown in FIGS. 4B–10B, as the position of the cam 82 within the cam slot 78 in the rooster comb 28, changes the position of the adapter 26 changes relative to an axis 100. As mentioned above, the rotary position sensor 22 is directly coupled to the adapter 26. Thus, incremental changes in the position of the adapter 26 result in corresponding rotational changes in the rooster comb 28. These rotational changes are used to generate an electrical signal representative of the angular position of the adapter 26 as well as the rooster comb 28. These signals, in turn, may be applied to a power train control module, for example, by way of cable 102 (FIG. 2B) to provide a cranking enable to allow the engine in the vehicle to be started only when the vehicle is in the park or neutral position. The signals from the sensor may also be used in applications, for example, hybrid hydraulic/electronic transmission in which one or more transmission shift positions are hydraulically controlled by a manual hydraulic control valve and one or more of the transmission positions are electronically controlled by an electronic solenoid. Lastly, these signals may be used to control the reverse back-up lamps as well as provide a position indication on the dashboard to the driver of vehicle of the selected shift position.

Obviously, many modifications and variations of the present invention are possible in light of the above teachings. For example, thus, it is to be understood that, within the scope of the appended claims, the invention may be practiced otherwise than as specifically described above.

What is claimed and desired to be secured by Letters Patent of the United States is:

We claim:

1. A transmission shift position sensor comprising:
   a rotary position sensor;
   a rooster comb;
   an adapter mechanically coupled to said rooster comb and to said rotary position sensor; and
   a bracket for rigidly carrying said rotary position sensor, said bracket including an aperture for rotatably receiving an end of said adapter, wherein said adapter includes an increased diameter portion, said increased diameter portion forming a pair of opposing surfaces for contact with said bracket and said rooster comb.

2. The transmission shift position sensor as recited in claim 1, wherein said bracket includes one or more mounting flanges for enabling said sensor to be secured within an automatic transmission housing.

3. The transmission shift position sensor as recited in claim 1, wherein said rotary position sensor is a non-contact sensor.

4. The transmission shift position sensor as recited in claim 1, wherein said rotary position sensor includes a Hall effect IC.

* * * * *